US012695584B2

(12) United States Patent
Baek et al.

(10) Patent No.: US 12,695,584 B2
(45) Date of Patent: Jul. 28, 2026

(54) METHOD AND DEVICE FOR BWP SWITCHING FOR RECEIVING MBS IN MOBILE COMMUNICATION SYSTEM

(71) Applicant: Samsung Electronics Co., Ltd., Suwon-si (KR)

(72) Inventors: Sangkyu Baek, Suwon-si (KR); Anil Agiwal, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 419 days.

(21) Appl. No.: 17/924,582

(22) PCT Filed: May 12, 2021

(86) PCT No.: PCT/KR2021/005928
§ 371 (c)(1),
(2) Date: Nov. 10, 2022

(87) PCT Pub. No.: WO2021/230645
PCT Pub. Date: Nov. 18, 2021

(65) Prior Publication Data
US 2023/0231692 A1      Jul. 20, 2023

(30) Foreign Application Priority Data
May 12, 2020      (KR) ........................ 10-2020-0056671

(51) Int. Cl.
*H04L 5/00*          (2006.01)
*H04W 72/0457*    (2023.01)
*H04W 72/30*        (2023.01)

(52) U.S. Cl.
CPC ....... *H04L 5/0098* (2013.01); *H04W 72/0457* (2023.01); *H04W 72/30* (2023.01)

(58) Field of Classification Search
CPC ............ H04L 5/0098; H04W 72/0457; H04W 72/30; H04W 4/70; H04W 4/06; H04W 72/0453; H04W 76/40
See application file for complete search history.

(56) References Cited

U.S. PATENT DOCUMENTS 1,006,443 A      10/1911  Davis
2016/0337817 A1   11/2016  Malladi et al.
(Continued)

FOREIGN PATENT DOCUMENTS

KR      10-2018-0080989 A      7/2018
KR      10-2018-0132135 A      12/2018
(Continued)

OTHER PUBLICATIONS

Extended European Search Report dated Jul. 31, 2023, issued in a European Patent Application No. 21803976.6.
(Continued)

*Primary Examiner* — Thomas R Cairns
*Assistant Examiner* — Raenita Ann Fenner
(74) *Attorney, Agent, or Firm* — Jefferson IP Law, LLP

(57)      ABSTRACT

According to an embodiment of the present disclosure, an operation method of a user equipment (UE) in a wireless communication system may be provided. The operation method may include identifying whether an active bandwidth part (BWP) is the same as a BWP for a multicast and broadcast service (MBS) selected by the UE, transmitting, to a base station, a message including information about the MBS when the active BWP is different from the BWP for the MBS, receiving, from the base station, based on the message, information for providing a service based on the MBS, and receiving the MBS, based on the information for providing the service based on the MBS.

6 Claims, 13 Drawing Sheets

(56)                References Cited

U.S. PATENT DOCUMENTS

| | | | |
|---|---|---|---|
| 2018/0192255 A1 | 7/2018 | Guo et al. | |
| 2019/0166580 A1 | 5/2019 | Prasad et al. | |
| 2019/0373667 A1 | 12/2019 | Jeon et al. | |
| 2021/0204206 A1 | 7/2021 | Kim et al. | |
| 2022/0322169 A1* | 10/2022 | Park | H04W 36/0007 |
| 2023/0040690 A1* | 2/2023 | Chen | H04W 72/30 |
| 2023/0044660 A1* | 2/2023 | Zhu | H04W 4/06 |
| 2023/0093727 A1* | 3/2023 | Lin | H04L 1/0061 |
| | | | 370/312 |

FOREIGN PATENT DOCUMENTS

| | | | |
|---|---|---|---|
| KR | 10-2019-0036162 A | 4/2019 | |
| KR | 10-2021-0120391 A | 10/2021 | |
| WO | 2020/088369 A1 | 5/2020 | |

OTHER PUBLICATIONS

Mediatek Inc: Remaining Details on Bandwidth Part Operation in NR, 3GPP TSG RAN WG1 Meeting #93, R1-1806775, XP051462746, May 12, 2018, Busan, Korea.

European Notice of Allowance dated Jan. 9, 2025, issued in European Patent Application No. 21803976.6.

3rd Generation Partnership Project; Technical Specification Group Services and System Aspects; Study on architectural enhancements for 5G multicast-broadcast services (Release 17), 3GPP TR 23.757 V0.3.0 (Jan. 2020), Jan. 29, 2020.

Korean Office Action dated Jun. 13, 2025, issued in Korean Patent Application No. 10-2020-0056671.

* cited by examiner

METHOD AND DEVICE FOR BWP SWITCHING FOR RECEIVING MBS IN MOBILE COMMUNICATION SYSTEM

TECHNICAL FIELD

The present disclosure relates to operation methods of a terminal and a base station for receiving a multicast and broadcast service (MBS) in a mobile communication system.

BACKGROUND ART

Efforts have been made to develop an improved 5th generation (5G) communication system or pre-5G communication system to keep up with growing wireless data traffic demand after the commercialization of 4th generation (4G) communication systems. For this reason, the 5G or pre-5G communication system is called a beyond 4G network communication system or a post long-term evolution (LTE) system. Implementation of 5G communication systems in an ultra-high frequency (millimeter-wave (mmWave)) band (such as a 60-GHz band) is under consideration to achieve high data transfer rates. To mitigate path loss of radio waves and increase transmission distance of radio waves in an ultra-high frequency band for 5G communication systems, technologies such as beamforming, massive multiple-input multiple-output (MIMO), full dimensional MIMO (FD-MIMO), array antennas, analog beamforming, and large-scale antennas are being studied. Furthermore, to improve system networks for 5G communication systems, various technologies including evolved small cells, advanced small cells, cloud radio access network (Cloud-RAN), ultra-dense networks, device to device (D2D) communication, wireless backhaul, moving networks, cooperative communication, coordinated multi-points (CoMP), and received-interference cancellation are currently being developed. In addition, for 5G systems, advanced coding modulation (ACM) schemes, such as Hybrid FSK and QAM Modulation (FQAM) and Sliding Window Superposition Coding (SWSC), and advanced access techniques, such as Filter Bank Multicarrier (FBMC), non-orthogonal multiple access (NOMA), sparse code multiple access (SCMA), etc. are being developed.

Moreover, the Internet has evolved from a human-centered connection network, in which humans create and consume information, to the Internet of things (IoT) network in which dispersed components such as objects exchange information with one another to process the information. Internet of Everything (IoE) technology has emerged, in which the IoT technology is combined with, for example, technology for processing big data through connection with a cloud server. To implement the IoT, technologies such as a sensing technology, a wired/wireless communication and network infrastructure, a service interface technology, and a security technology are required, and thus, research has recently been conducted into technologies such as sensor networks for interconnecting objects, machine to machine (M2M) communication, and machine type communication (MTC). In an IoT environment, intelligent Internet technology services may be provided to create new values for human life by collecting and analyzing data obtained from interconnected objects. The IoT may be applied to various fields such as smart homes, smart buildings, smart cities, smart cars or connected cars, a smart grid, healthcare, smart home appliances, advanced medical services, etc., through convergence and integration between existing information technology (IT) and various industries.

Thus, various attempts are being made to apply a 5G communication system to the IoT network. For example, technologies such as sensor networks, M2M communication, MTC, etc., are implemented using 5G communication techniques such as beamforming, MIMO, array antennas, etc. The application of a cloud RAN as the above-described big data processing technology may be an example of convergence between the 5G and IoT technologies.

As various services may be provided with the advancements in mobile communication systems as described above, in particular, a method of efficiently providing a multicast and broadcast service (MBS) service is required.

DESCRIPTION OF EMBODIMENTS

Technical Problem

Embodiments of the present disclosure provide a device and method for effectively providing a multicast and broadcast service (MBS) service in a mobile communication system.

In particular, the embodiments of the present disclosure provide a method and device for effectively providing an MBS service when a bandwidth part (BWP) where the corresponding MBS service is provided is different from an active BWP of a user equipment (UE).

Solution to Problem

According to an embodiment of the present disclosure, an operation method of a user equipment (UE) in a wireless communication system may be provided. The operation method may include identifying whether an active bandwidth part (BWP) is the same as a BWP for a multicast and broadcast service (MBS) selected by the UE, transmitting, to a base station, a message including information about the MBS when the active BWP is different from the BWP for the MBS, receiving, from the base station, based on the message, information for providing a service based on the MBS, and receiving the MBS, based on the information for providing the service based on the MBS.

Advantageous Effects of Disclosure

Embodiments of the present disclosure provide a device and method for effectively providing a multicast and broadcast service (MBS) service in a mobile communication system.

In particular, the embodiments of the present disclosure provide a method and device for effectively providing an MBS service when a bandwidth part (BWP) where the corresponding MBS service is provided is different from an active BWP of a user equipment (UE).

BEST MODE

Figure 1:
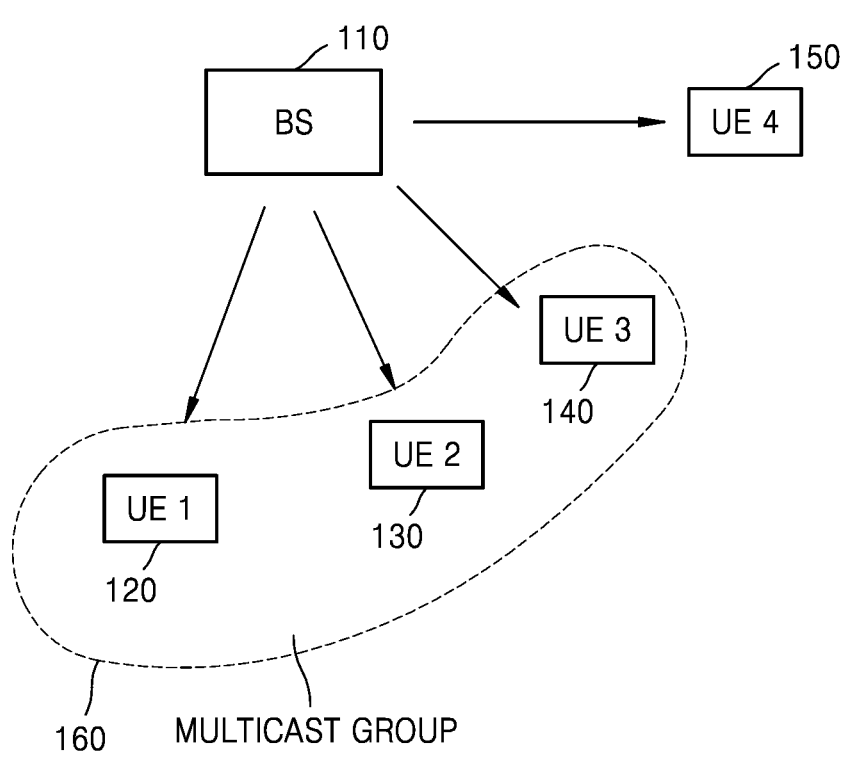
FIG. 1 illustrates an operating scheme for multicast and broadcast service (MBS) communication, according to an embodiment of the present disclosure.

According to an embodiment of the present disclosure, an operation method of a user equipment (UE) in a wireless communication system may be provided. The operation method of the UE may include identifying whether an active bandwidth part (BWP) is the same as a BWP for a multicast and broadcast service (MBS) selected by the UE, transmitting, to a base station, a message including information about the MBS when the active BWP is different from the BWP for the MBS, receiving, from the base station, based on the message, information for providing a service based on the MBS, and receiving the MBS based on the information for providing the service based on the MBS.

According to an embodiment, the operation method may further include, in case that the information for providing the service based on the MBS includes BWP switching information, switching, based on the BWP switching information, the active BWP from a BWP configured for the UE to another BWP, and the receiving of the MBS may include receiving the MBS on the switched active BWP.

According to an embodiment, the BWP switching information may be included in a radio resource control (RRC) Reconfiguration message or downlink control information (DCI).

According to an embodiment, in case that the information for providing the service based on the MBS includes updated MBS information, the updated MBS information may include information about an added MBS provided on the active BWP, and the receiving of the MBS may include receiving, based on the updated MBS information, the MBS on the active BWP.

According to an embodiment, the updated MBS information may be included in an RRC reconfiguration message or a system information block message.

According to an embodiment, the operation method may further include, after transmitting the message including the information about the MBS, starting a timer for prohibiting retransmission of the message including the information about the MBS.

According to an embodiment of the present disclosure, an operation method of a base station in a wireless communication system may be provided. The operation method of the base station may include, in case that an active BWP is different from a BWP for an MBS selected by a UE, receiving, from the UE, a message including information about the MBS; determining, based on the message including the information about the MBS, information for providing a service based on the MBS; transmitting, to the UE, the information for providing the service based on the MBS; and transmitting, to the UE, the MBS based on the information for providing the service based on the MBS.

According to an embodiment, in case that the information for providing the service based on the MBS includes BWP switching information, the active BWP may be switched from a BWP configured for the UE to another BWP based on the BWP switching information, and the transmitting of the MBS may include transmitting the MBS on the switched active BWP.

According to an embodiment, the BWP switching information may be included in an RRC reconfiguration message or DCI.

According to an embodiment, in case that the information for providing the service based on the MBS includes updated MBS information, the updated MBS information may include information about an added MBS provided on the active BWP, and the transmitting of the MBS may include transmitting, based on the updated MBS information, the MBS on the active BWP.

According to an embodiment, the updated MBS information may be included in an RRC reconfiguration message or a system information block message.

According to an embodiment of the present disclosure, a UE operating in a wireless communication system may be provided. The UE may include: a communicator; and at least one processor connected with the communicator and configured to identify whether an active BWP is the same as a BWP for an MBS selected by the UE, transmit, to a base station, a message including information about the MBS when the active BWP is different from the BWP for the MBS, receive, from the base station, based on the message, information for providing a service based on the MBS, and receive the MBS based on the information for providing the service based on the MBS.

According to an embodiment, the at least one processor may be further configured to, in case that the information for providing the service based on the MBS includes BWP switching information, switch, based on the BWP switching information, the active BWP from a BWP configured for the UE to another BWP, and receive the MBS on the switched active BWP.

According to an embodiment, in case that the information for providing the service based on the MBS includes updated MBS information, the updated MBS information may include information about an added MBS provided on the active BWP, and the at least one processor may be further configured to receive, based on the updated MBS information, the MBS on the active BWP.

According to an embodiment of the present disclosure, a base station operating in a wireless communication system may be provided. The base station may include: a communicator; and at least one processor connected with the communicator and configured to, when an active BWP is different from a BWP for an MBS selected by a UE, receive, from the UE, a message including information about the MBS, determine, based on the message including the information about the MBS, information for providing a service based on the MBS, transmit, to the UE, the information for providing the service based on the MBS, and transmit, to the UE, the MBS based on the information for providing the service based on the MBS.

MODE OF DISCLOSURE

In the following descriptions of the present disclosure, related known functions or configurations are not described in detail when it is deemed that they would unnecessarily obscure the essence of the present disclosure. Hereinafter, embodiments of the present disclosure will be described in detail with reference to the accompanying drawings.

Advantages and features of the present disclosure and methods of accomplishing the same will be more readily appreciated by referring to the following description of embodiments and the accompanying drawings. However, the present disclosure may be embodied in many different forms and should not be construed as being limited to the disclosed embodiments set forth herein; rather, the present embodiments are provided so that the present disclosure will be thorough and complete and will fully convey the concept of the present disclosure to those of ordinary skill in the art, and the present disclosure will only be defined by the appended claims. Throughout the specification, like reference numerals refer to like elements.

It will be understood that each block of a flowchart in the drawings and combinations of blocks of the flowchart may be performed by computer program instructions. These computer program instructions may be loaded into a processor of a general-purpose computer, a special-purpose computer, or another programmable data processing equipment, and thus, the instructions performed via the processor of the computer or the other programmable data processing equipment create a means for performing functions specified in the flowchart block(s). The computer program instructions may also be stored in a computer-executable or computer-readable memory capable of directing the computer or the other programmable data processing equipment to implement functions in a specific manner, and thus, the instructions stored in the computer-executable or computer-readable memory may produce an article of manufacture including instruction means for performing the functions described in the flowchart block(s). The computer program instructions may also be loaded into the computer or the other programmable data processing equipment, and thus, instructions for operating the computer or the other programmable data processing equipment by generating a computer-executed process when a series of operations are performed in the computer or the other programmable data processing equipment may provide operations for performing the functions described in the flowchart block(s).

In addition, each block may represent a portion of a module, segment, or code that includes one or more executable instructions for executing specified logical function(s). It should also be noted that, in some alternative implementations, functions mentioned in blocks may occur out of order. For example, two blocks illustrated in succession may be executed substantially simultaneously, or the blocks may sometimes be executed in reverse order depending on functions corresponding thereto.

As used herein, the term 'unit' denotes a software element or a hardware element such as a field-programmable gate array (FPGA) or an application-specific integrated circuit (ASIC), and the 'unit' performs certain functions. However, the term 'unit' is not limited to software or hardware. The 'unit' may be configured so as to be in an addressable storage medium, or may be configured so as to operate one or more processors. Thus, for example, the term 'unit' may include elements, such as software elements, object-oriented software elements, class elements, and task elements, processes, functions, attributes, procedures, subroutines, segments of program code, drivers, firmware, micro-codes, circuits, data, a database, data structures, tables, arrays, and variables. Functions provided by the elements and 'units' may be combined into the smaller number of elements and 'units', or may be divided into additional elements and 'units'. Furthermore, the elements and 'units' may be embodied to reproduce one or more central processing units (CPUs) in a device or security multimedia card. In addition, in an embodiment, the 'unit' may include one or more processors.

In the following descriptions of the present disclosure, related known functions or configurations are not described in detail when it is deemed that they would unnecessarily obscure the essence of the present disclosure. Hereinafter, embodiments of the present disclosure will be described in detail with reference to the accompanying drawings.

As used in the following description, terms identifying access nodes, terms indicating network entities, terms indicating messages, terms indicating interfaces between network entities, terms indicating various types of identification information, etc. are exemplified for convenience of descriptions. Accordingly, the present disclosure is not limited to terms to be described later, and other terms representing objects having the equivalent technical meaning may be used.

Hereinafter, for convenience of descriptions, the present disclosure uses terms and names defined in the 3rd Generation Partnership Project Long-Term Evolution (3GPP LTE) standard. However, the present disclosure is not limited to the terms and names but may also be identically applied to systems that comply with other standards. In the present disclosure, for convenience of descriptions, a next-generation Node B (gNB) may be used interchangeably with an evolved Node B (eNB). In other words, a base station (BS) described as an eNB may represent a gNB. Furthermore, the term 'terminal' may refer to a mobile phone, a machine type communication (MTC) device, a narrowband Internet of things (NB-IoT) device, a sensor, and other wireless communication devices.

Hereinafter, a BS is an entity that allocates resources to a terminal, and may be at least one of a gNB, an eNB, a Node B, a BS, a wireless access unit, a BS controller, or a network node. A terminal may include a user equipment (UE), a mobile station (MS), a cellular phone, a smart phone, a computer, or a multimedia system capable of performing a communication function. However, the BS or terminal is not limited to the above examples.

In particular, the present disclosure may be applied to the 3GPP new radio (NR) (5th generation (5G) mobile communication standard). Furthermore, the present disclosure may be applied to intelligent services (e.g., smart homes, smart buildings, smart cities, smart cars or connected cars, healthcare, digital education, retail businesses, security and safety-related services, etc.), based on a 5G communication technology and an IoT-related technology. In the present disclosure, for convenience of descriptions, a gNB may be used interchangeably with an eNB. In other words, a BS described as an eNB may represent a gNB. Furthermore, the term 'terminal' may refer to a mobile phone, a machine type communication (MTC) device, a narrowband Internet of things (NB-IoT) device, a sensor, and other wireless communication devices.

Wireless communication systems have progressed beyond providing initial voice-centered services into broadband wireless communication systems that provide high-speed, high-quality packet data services based on communication standards such as 3GPP's High Speed Packet Access (HSPA), LTE or Evolved Universal Terrestrial Radio Access (E-UTRA), LTE-Advanced (LTE-A), LTE Pro, 3GPP2's High Rate Packet Data (HRPD), Ultra Mobile Broadband (UMB), and the Institute of Electrical and Electronic Engineers (IEEE) 802.16e.

As a representative example of a broadband wireless communication system, an LTE system adopts an orthogonal frequency division multiplexing (OFDM) scheme for downlink (DL) and a single carrier frequency division multiple access (SC-FDMA) scheme for uplink (UL). UL refers to a radio link through which a UE (or a MS) transmits data or a control signal to a BS (or an eNB), and DL refers to a radio link through which the BS transmits data or a control signal to the UE. In the multiple access schemes as described above, data or control information of each user may be identified by allocating and operating time-frequency resources carrying the data or the control information for each user to prevent overlapping i.e., obtain orthogonality between the time-frequency resources.

Because a post-LTE communication system, i.e., a 5G communication system, needs to be able to freely reflect various requirements from users, service providers, etc., the 5G communication system is required to support services that simultaneously satisfy the various requirements. Services being considered for 5G communication systems include Enhanced Mobile BroadBand (eMBB), Massive Machine Type Communication (mMTC), Ultra-Reliable Low-Latency Communication (URLLC), etc.

According to some embodiments, eMBB may aim to provide higher data transfer rates than those supported by legacy LTE, LTE-A, or LTE Pro. For example, in 5G communication systems, eMBB should be able to deliver peak data rates of 20 gigabits per second (Gbps) in DL and 10 Gbps in UL from a BS perspective. Furthermore, the 5G communication systems should be able to provide better user perceived data rates while simultaneously delivering the peak data rates. To meet such requirements, the 5G communication systems may require improvement of various transmission and reception technologies including a further improved multi-input multi-output (MIMO) transmission technology. Furthermore, while a current LTE system transmits signals by using a maximum transmission bandwidth of 20 megahertz (MHz) in the 2 GHz band, a 5G communication system may satisfy data transfer rates required by a 5G technology by using a wider frequency bandwidth than 20 MHz in the 3 GHz to 6 GHz bands or the bands above 6 GHz.

At the same time, mMTC is being considered to support application services such as the IoT in 5G communication systems. In order to efficiently provide the IoT, the mMTC may require support of massive connections with terminals in a cell, enhanced terminal coverage, improved battery life, low terminal cost, etc. Because the IoT is a system equipped with multiple sensors and various devices to provide communication functions, it must be able to support a large number of terminals (e.g., 1,000,000 terminals per square kilometer ($km^2$)) in a cell. Furthermore, because a terminal supporting the mMTC is highly likely to be located in a shaded area that cannot be covered by a cell, such as a basement of a building, due to characteristics of the service, the mMTC may require wide area coverage compared to other services provided by a 5G communication system. The terminal supporting the mMTC should be configured as a low-cost terminal and require a very long battery lifetime such as 10 to 15 years because it is difficult to frequently replace a battery of the terminal.

Lastly, URLLC is a cellular-based wireless communication service used for mission-critical applications such as remote control of robots or machinery, industrial automation, unmanned aerial vehicles (UAVs), remote healthcare, emergency alert services, etc. Thus, URLLC communications should be able to provide very low latency (ultra-low latency) and very high reliability (ultra-high reliability). For example, services supporting URLLC need to satisfy air interface latency of less than 0.5 milliseconds (ms) and simultaneously have requirements of packet error rate of equal to or less than $10^{-5}$. Thus, for the services supporting URLLC, a 5G system has to provide a transmit time interval (TTI) shorter than for other services and may simultaneously require a design for allocating wide frequency-band resources to ensure high reliability of a communication link.

The above-described three services considered in the 5G communication systems, i.e., eMBB, URLLC, and mMTC, may be multiplexed in one system for transmission. In this regard, different transmission and reception techniques and transmission and reception parameters may be used between services to satisfy different requirements for the respective services. However, the mMTC, URLLC, and eMBB are merely examples of different service types, and service types to which the present disclosure is applied are not limited to the above-described examples.

Furthermore, although embodiments of the present disclosure will be described using an LTE, LTE-A, LTE Pro, or 5G (or NR that is next-generation mobile communication) system as an example, the embodiments of the present disclosure may be applied to other communication systems having similar technical backgrounds and channel configurations. It should be also understood by a person skilled in the art that embodiments of the present disclosure are applicable to other communication systems through some modifications not departing from the scope of the present disclosure.

FIG. 1 illustrates an operating scheme for multicast and broadcast service (MBS) communication, according to an embodiment of the present disclosure.

MBS communication refers to a method by which one transmitting device communicates with several receiving devices in a mobile communication system. In this case, the transmitting device may be a BS 110, and the receiving devices may be UEs 120, 130, 140, and 150. However, the transmitting device may be the UEs 120, 130, 140, and 150. FIG. 1 shows that MBS communication is performed between the BS 110 that is a transmitting device and the UEs 120, 130, 140, 150 that are receiving devices. Such MBS communication may be a broadcast for an unspecified number of devices or a multicast for specific multiple receiving devices. When performing communication using a multicast method, the BS 110 may configure only specific UEs to receive corresponding multicast packets. To achieve this, the BS 110 may configure a set of UEs with which to perform a specific multicast communication, and the set of UEs are referred to as a multicast group 160 in FIG. 1. In the embodiment of FIG. 1, UE 1 120, UE 2 130, and UE 3 140 configured as one multicast group 160 are allocated a G-RNTI from the BS 110, and the BS 110. It is assumed that data from. The UEs 120, 130, and 140 in the multicast group 160 may be assigned the same group radio network temporary identifier (G-RNTI) to receive allocated data by using the corresponding G-RNTI. In the embodiment of FIG. 1, it is assumed that UE 1 120, UE 2 130, and UE 3 140 configured as the multicast group 160 are assigned a G-RNTI by the BS 110 and receive data from the BS 110 by using a multicast method. Because UE 4 150 is not included in the multicast group 160, the UE 4 150 is not assigned the G-RNTI by the BS 110. Accordingly, the UE 4 150 may not receive the data that the UE 1 120, the UE 2 130, and the UE 3 140 receive from the BS (110). One or more multicast groups 160 may be configured in the coverage provided by the BS 110, and each multicast group may be identified by a G-RNTI. One UE may be assigned one or more G-RNTIs by the BS 110. In a radio resource control (RRC) Idle mode or an RRC Inactive mode as well as in an RRC Connected mode, the UE may receive multicast data by using a G-RNTI value assigned in the RRC Connected mode. A G-RNTI may be included and configured in at least one of RRC Reconfiguration, RRC Setup, or RRC Reestablishment messages received by the UE in the RRC Connected mode. However, in another embodiment, the BS 110 may transmit a system information block (SIB) including a G-RNTI value that can be received by the UE. The UE configured with the G-RNTI value in this way may apply the G-RNTI value thereafter.

Figure 2:
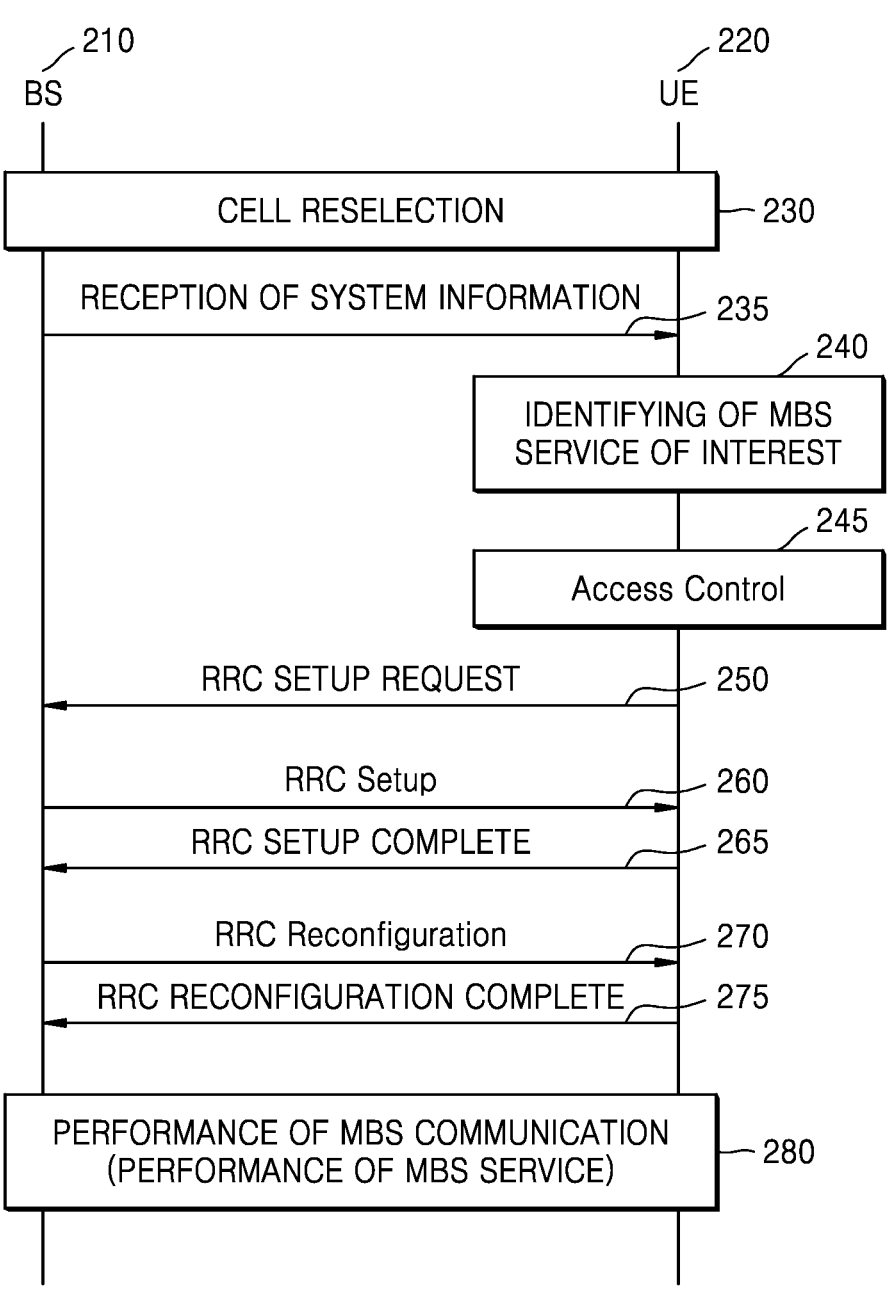
FIG. 2 illustrates a configuration procedure for performing MBS communication, according to an embodiment of the present disclosure.

FIG. 2 illustrates a configuration procedure for performing MBS communication, according to an embodiment of the present disclosure.

A UE 220 that does not have an RRC connection with a BS 210 may select the BS 210 from which to request an MBS service in order to perform MBS communication. In this case, the UE 220 may receive synchronization signals transmitted from the BS 210 to perform a cell selection or cell reselection procedure for selecting the BS 210 with a high received signal strength (230). In the embodiment of FIG. 2, it is assumed that the UE 220 performs a cell reselection operation for selecting a cell when it transitions to an RRC Idle mode or RRC Inactive mode after an initial RRC Connected state.

Thereafter, the UE 220 may receive a SIB from the selected cell (235). At that time, if the UE 220 wants to receive an MBS service, the UE 220 may receive a SIB including MBS information among SIBs. The SIB including the MBS information may include a list of MBS services that are already provided or may be provided by each serving cell. The list of MBS services that are already provided or may be provided by each serving cell as described above may be referred to as AvailableMBSList. AvailableMBSList may include pieces of MBS session information. MBS session information may include a temporary mobile group identity (tmgi) value used to identify a group and an MBS session ID (sessionID). A tmgi value may include a public land mobile network (PLMN) ID (plmn-ID) that identifies whether a service is provided by a communication operator and a service ID (serviceID) that identifies a service provided by the communication operator. When such information is combined, AvailableMBSList may have the following exemplary structure.

AvailableMBSList=MBSSessionInfoList
       MBSSessionInfoList=Sequence of (tmgi, sessionID)
         tmgi=(plmn-id, serviceID)

When all UEs request RRC configuration in order to receive all MBS services, the BS 210 may be overloaded due to a large number of UEs instantaneously attempting access to the BS 210. Therefore, an access control method for an MBS service may be required. To this end, an Access Category value and uac-BarringForAccessIdentity for access control may be configured in each tmgi. The frequency of requests for access to the BS 210 for each tmgi may be controlled by using the configured Access category and uac-BarringForAccessIdentity. Although it is assumed in the embodiment of FIG. 2 that the UE 220 receives the SIB including the MBS information, according to an embodiment, such MBS information may be transmitted in a DL Information Transfer message.

Upon receiving the SIB including the MBS information, the UE 220 may identify an MBS service of interest among the list of MBS services that are already provided or may be provided by each serving cell (240). When the UE 220 identifies the MBS service of interest, the identified MBS service may be an MBS service required by an application of the UE 220, and the UE 220 may determine which MBS service it is interested in according to other conditions. The UE 220 may identify an MBS service based on a tmgi. In other words, the UE 220 may check whether a tmgi for an MBS service that the UE 220 wants to receive (the UE 220 is interested in) is included in the SIB including the MBS information. In detail, the UE 220 may check whether the tmgi for the desired MBS service that the UE 220 wants to receive is included in the AvailableMBSList in the SIB including the MBS information. If the tmgi for the desired MBS service is included in the SIB including the MBS information, the UE 220 may perform an operation of establishing an RRC connection to receive the corresponding MBS service. In order to determine whether the UE 220 initiates RRC connection setup, the UE 220 may perform an access control operation (245). The UE 220 may perform, based on a PLMN ID (plmn-ID) included in the tmgi for the desired MBS service, access control by using UAC-Barring information for the corresponding PLMN ID. The UE 220 may determine whether an access is allowed for the uac-BarringForAccessIdentity and Access Category for the desired MBS service. If an access for receiving the MBS service is allowed, the UE 220 may start a procedure for requesting an RRC connection.

If the UE 220 is allowed access for receiving the MBS service, the UE 220 may transmit an RRC Setup Request message to the BS 210 (250). In the present disclosure, an RRC connection request is not limited to the RRC Setup Request message, and according to an embodiment, an RRC Reestablishment Request message may also be used for the same purpose. Because the RRC Setup Request message or RRC Reestablishment Request message is a general message that can be used by the UE 220 to transition to an RRC Connected mode, such message may include a cause value indicating a purpose for which the UE 220 intends to transition to the RRC Connected mode. At this time, if the UE 220 wants to receive an MBS service, it may transmit, to the BS 210, an RRC Setup Request or RRC Reestablishment Request message including a cause value indicating that MBS configuration is desired. However, if the RRC Setup Request or RRC Reestablishment Request message is not for an RRC setup request or RRC reestablishment request transmitted by the UE 220 to receive an MBS service, the UE 220 may transmit the corresponding message using a cause value passed from an upper layer. The BS 210 may transmit an RRC Setup message in order for the UE 220 to transition to the RRC Connected mode (260). However, in the present disclosure, a message for switching the UE 220 to the RRC Connected mode is not limited to the RRC Setup message, and according to an embodiment, an RRC Reestablishment message may also be used for the same purpose. When the UE 220 receives the RRC Setup message or RRC Reestablishment message, signaling radio bearer 1 (SRB1) may be configured by configuration information for the SRB1 included in the corresponding message. SRB1 may be a radio bearer for exchanging RRC messages between the BS 210 and the UE 220.

After applying the configuration information included in the RRC Setup message or the RRC Reestablishment message, the UE 220 may inform the BS 210 that reception configuration from the BS 210 has been successfully applied by transmitting an RRC Setup Complete or RRC Reestablishment Complete message to the BS 210 (265). In addition, the RRC Setup Complete message or RRC Reestablishment Complete message transmitted in operation 265 may include a list of MBS services that the UE 220 wants to receive. The list of MBS services may be a list including tmgi values respectively corresponding to the MBS services that the UE 220 wants to receive. In this case, a tmgi included in the list of MBS services may be a tmgi included in the SIB (or DL Information Transfer message) transmitted by the BS 210 to the UE 220 in operation 235. More specifically, the tmgi values included in the list of MBS services may correspond to all or some of the tmgis included in the list of MBS services that are already provided or may be provided by each serving cell.

Because SRB1 is configured and the list of MBS services that the UE 220 wants to receive are transmitted to the BS 210 in operation 265 that is a preceding operation, the BS 210 may configure a method of receiving an MBS service based thereon (270).

According to an embodiment, the MBS service may be configured using an RRC Reconfiguration message transmitted by the BS 210 to the UE 220. According to an embodiment, the RRC Reconfiguration message may include configuration information for signaling radio bearer 2 (SRB2) used for transmitting and receiving a non-access stratum (NAS) message, a data radio bearer (DRB) used for transmitting and receiving data, and a point-to-multipoint (PTM) DRB used for multicast transmission. Here, the PTM DRB may be configured without being distinguished from a general DRB, or may be configured by a received G-RNTI.

Furthermore, the BS 210 may configure a radio link control (RLC) bearer over which the configured radio bearer is to be transmitted, and may also configure which radio bearer will be linked with the configured RLC bearer.

According to an embodiment, the BS 210 may configure a G-RNTI via which UEs belonging to a multicast group can receive multicast data. According to an embodiment, a G-RNTI is an RNTI configured for reception of a transport block (TB) and may be used to indicate scheduling information for a physical DL shared channel (PDSCH). According to an embodiment, a G-RNTI may be configured per media access control (MAC) entity, but may be configured per bandwidth part (BWP). If a G-RNTI is configured per BWP, the configured G-RNTI may be used only when receiving PDSCH resources in a corresponding BWP. In other words, the G-RNTI may not be used in another BWP. To this end, the G-RNTI may be included and configured in a DL BWP configuration (BWP-DownLink configuration) field in an RRC message. According to an embodiment, a BWP ID used when the G-RNTI is configured may be configured. In another embodiment, the G-RNTI may be configured per cell. If the G-RNTI is configured for each cell, the configured G-RNTI may be used only when receiving PDSCH resources of the cell. In other words, the corresponding G-RNTI may not be used in another cell. To this end, the G-RNTI may be included and configured in a cell configuration field in the RRC message. However, a cell ID to be used when the G-RNTI is configured may be configured.

According to an embodiment, the BS 210 may separately configure the UE 220 with a BWP and a search space for reception of an MBS service. Information about a BWP and a search space used for receiving a specific MBS service may be configured by the BS 210 for the UE 220. The configuration information may include an MBS BWP and an MBS search space. Here, the MBS BWP may mean a BWP to which the assigned G-RNTI is applied. According to an embodiment, a BWP including the G-RNTI in the BWP-Downlink configuration field may be the MBS BWP. Here, the MBS search space may be a search space for which a DL control information (DCI) format for MBS reception is configured in search space configuration information, or a search space including an indicator indicating a search space for MBS reception in the search space configuration information. According to an embodiment, the search space configuration information may include a 1-bit indicator indicating whether the corresponding search space is an MBS search space. If the indicator indicates that the search space is an MBS search space, the search space may be an MBS search space and may be used as a search space for monitoring a G-RNTI for MBS reception.

If the UE 220 has applied information included in the RRC Reconfiguration message in the preceding operation 270, the UE 220 may inform the BS 210 that the information in the RRC Reconfiguration message has been applied by transmitting an RRC Reconfiguration Complete message to the BS 210 (275).

Based on the above-described process, the UE 220 may receive a broadcast or multicast packet by performing MBS communication. In other words, the UE 220 may receive the MBS service from the BS 210 (280).

Figure 3:
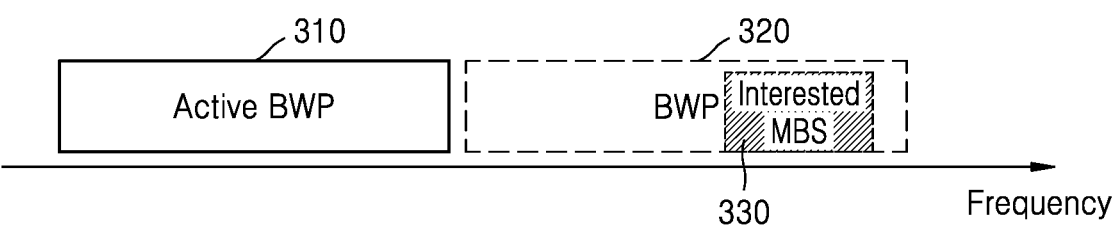
FIG. 3 illustrates an example in which an active bandwidth part (BWP) of a user equipment (UE) is different from a BWP associated with an MBS service of interest, according to an embodiment of the present disclosure.

FIG. 3 illustrates an example in which an active BWP of a UE is different from a BWP associated with an MBS service of interest, according to an embodiment of the present disclosure.

A BS may have several BWPs on a frequency axis. However, only one of these BWPs may be activated and used as an active BWP. The UE monitors and uses only an active BWP while not monitoring a BWP other than the active BWP. In the embodiment of FIG. 3, it is assumed that two BWPs 310 and 320 are configured and only one of the two BWPs is activated as the active BWP 310. However, when a specific MBS service is provided only on the specific BWP 320 and the UE receives data on the active BWP 310, the UE cannot receive an MBS service provided on another BWP. For example, when the UE wants to receive specific broadcast data provided to an unspecified UE, an active BWP of the UE may be different from a BWP on which broadcast data that the UE is interested in is transmitted. In the embodiment of FIG. 3, the MBS service 330 that the UE is interested in is provided on the BWP 320 other than the active BWP 310. In this case, in order to receive the corresponding MBS service 330, the UE has to perform data reception in the BWP 320 on which the corresponding MBS service 330 is provided. Here, the unit of the MBS service 330 may be a tmgi. In embodiments of FIGS. 4 to 11, methods performed by the UE to receive the MBS service 330 when the BWP 320 on which the MBS service 330 that the UE is interested in is provided is different from the active BWP 310 of the UE are described below.

Figure 4:
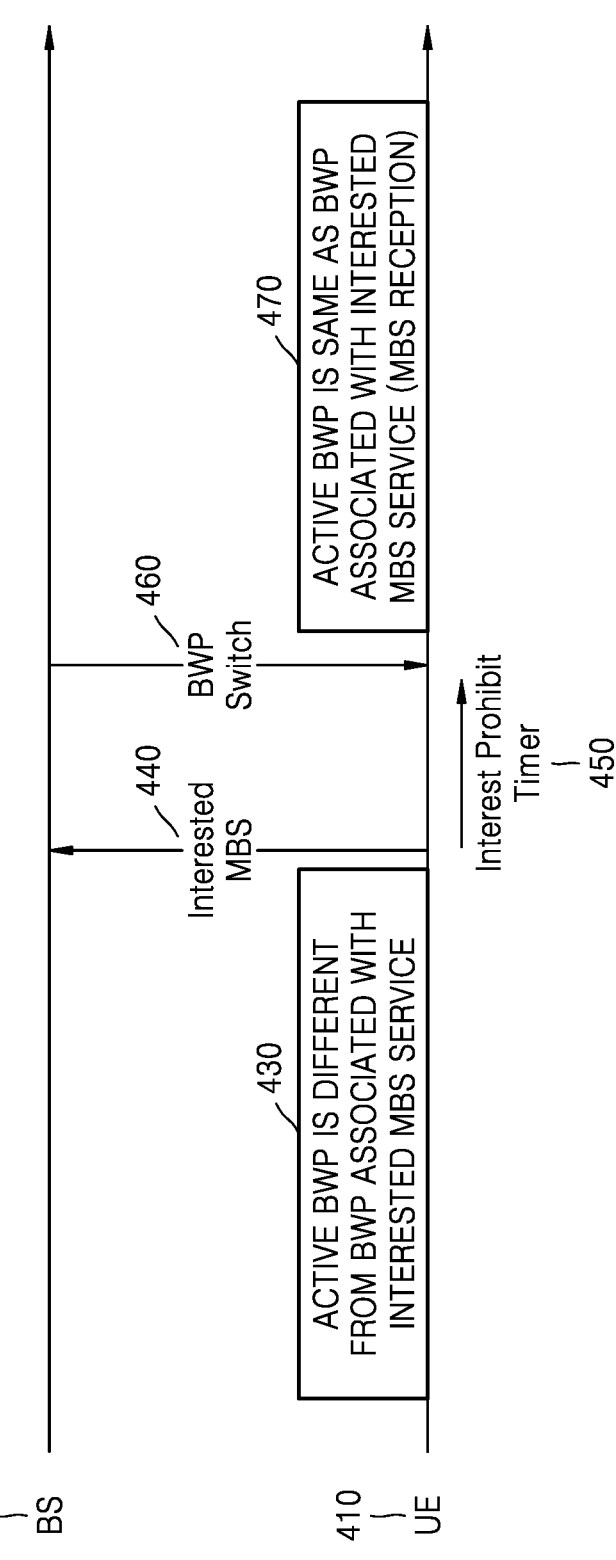
FIG. 4 illustrates a method, performed by a UE, of receiving an MBS service by performing BWP switch, according to an embodiment of the present disclosure.

FIG. 4 illustrates a method, performed by a UE, of receiving an MBS service by performing BWP switch, according to an embodiment of the present disclosure.

The embodiment of FIG. 4 relates to, when a BWP on which an MBS service that a UE 410 is interested in is provided is different from an active BWP, a method, performed by the UE 410, of informing a BS 420 of the MBS service of interest and switching the active BWP to the BWP on which the corresponding MBS service is provided.

In the embodiment of FIG. 4, the UE 410 may receive, from the BS 420, data on the active BWP. However, at this time, an MBS service that the UE 410 is interested in may not be provided on the active BWP (430).

If the active BWP is different from a BWP associated with the MBS service desired by the UE 410, the UE 410 may inform the BS 420 that there is an MBS service of interest in order to receive the MBS service of interest, and request or induce switching of the active BWP to the BWP on which the corresponding MBS service is provided (440). A message transmitted by the UE 410 to the BS 420 in operation 440 may include a list of MBS services that the UE 410 desires to receive. According to an embodiment, the unit of the MBS service may be a tmgi. Also, according to an embodiment, a UE assistance information message may be used as the message transmitted in operation 440.

After the UE 410 informs the BS 420 that there is the MBS service of interest (440), the BS 420 may indicate BWP switch (460). In operation 460, an operation of the UE 410 switching the active BWP may be indicated by the BS 420 transmitting an RRC Reconfiguration message to the UE 410 in the RRC Connected mode or transmitting a command in DCI on a physical DL control channel (PDCCH).

However, the BS 420 is not necessarily required to indicate the BWP switch, and may need to keep the corresponding UE 410 staying on the currently active BWP according to the operation of a communication network. However, because the UE 410 cannot know a situation of the BS 420 and a decision made by the BS 420, the UE 420 may repeat operation 440 of informing the BS 420 that there is an MBS service of interest and requesting or inducing switching of the active BWP to the BWP on which the MBS service is provided. However, because the message repeatedly transmitted by the UE 410 may cause unnecessary resource consumption, repeated transmission of the message needs to be avoided. To this end, after the UE 410 transmits the message informing the BS 420 that there is an MBS service of interest (440), a prohibit timer for transmission of the corresponding message may be started (450). When the prohibit timer is running, the UE 410 may not transmit a message informing the BS 420 that there is an MBS service of interest. Only when the corresponding prohibit timer is stopped, the UE 410 may transmit a message informing the BS 420 that there is an MBS service of interest. In an embodiment, the message informing the BS 420 that there is an MBS service that the UE 410 is interested in may be transmitted when the list of MBS services that the UE 410 is interested in are changed and the prohibit timer is stopped.

If the active BWP of the UE 410 is switched in operation 460, the UE 410 may receive the corresponding MBS service because the currently active BWP is the same as the BWP associated with the MBS service of interest are the same (470).

Figure 5:
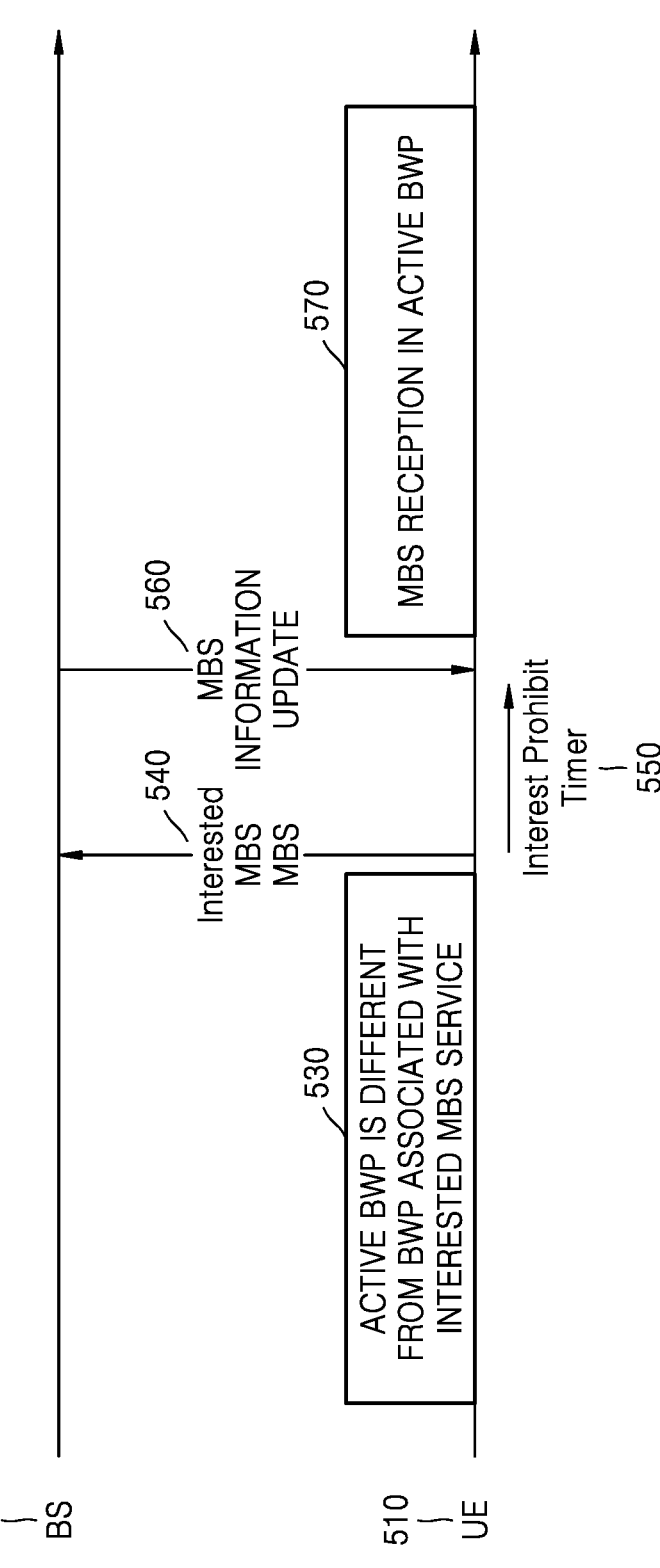
FIG. 5 illustrates a method, performed by a UE, of receiving an MBS service by updating MBS information by a base station, according to an embodiment of the present disclosure.

FIG. 5 illustrates a method, performed by a UE, of receiving an MBS service by updating MBS information by a BS, according to an embodiment of the present disclosure.

The embodiment of FIG. 5 relates to, when a BWP where an MBS service that a UE 510 is interested in is provided is different from an active BWP, a method by which the UE 510 informs a BS 520 of the MBS service of interest and the BS 520 provides the MBS service on the currently active BWP of the UE 510.

In the embodiment of FIG. 5, the UE 510 may receive, from the BS 520, data on the active BWP. However, at this time, an MBS service that the UE 510 is interested in may not be provided on the active BWP (530).

If the active BWP is different from a BWP associated with the MBS service desired by the UE 510, the UE 510 may inform the BS 520 that there is an MBS service of interest in order to receive the MBS service of interest, and request or induce the corresponding MBS service to be provided on the currently active BWP (540). A message transmitted by the UE 510 to the BS 520 in operation 540 may include a list of MBS services that the UE 510 desires to receive. According to an embodiment, the unit of the MBS service may be a tmgi. According to an embodiment, a UE assistance information message may be used as the message transmitted in operation 540.

After the UE 510 informs the BS 520 that there is the MBS service of interest (540), the BS 520 may update MBS information to add an MBS service provided on the active BWP (560). In operation 560, the BS 520 may transmit a list of MBS services provided on the BWP by using an RRC Reconfiguration message or a SIB message. Furthermore, the BS 520 may configure a G-RNTI via which the corresponding MBS services can be received. However, the BS 520 is not necessarily required to update the MBS information. For example, the BS 520 may keep the UE 510 staying on the currently active BWP according to the operation of a communication network, and may not transmit data associated with the MBS service that the UE 510 is interested in. However, because the UE 510 cannot know a situation of the BS 520 and a decision made by the BS 520, the UE 510 may repeat operation 540 of informing the BS 520 that there is an MBS service of interest and requesting or inducing the MBS service to be provided. However, the message repeatedly transmitted by the UE 510 as described above may cause unnecessary resource consumption, and thus, repeated transmission of the message needs to be avoided. To this end, after the UE 510 transmits the message informing the BS 520 that there is an MBS service of interest (540), a prohibit timer for transmission of the corresponding message may be started (550). When the prohibit timer is running, the UE 510 may not transmit a message informing the BS 520 that there is an MBS service of interest. Only when the corresponding prohibit timer is stopped, the UE 510 may transmit a message informing the BS 520 that there is an MBS service of interest. In an embodiment, the message informing the BS 520 that there is an MBS service that the UE 510 is interested in may be transmitted when the list of MBS services that the UE 510 is interested in are changed and the prohibit timer is stopped.

When the list of MBS services are updated by providing, on the active BWP of the UE 510, an MBS service that the UE 510 is interested in (560), the UE 510 may receive the corresponding MBS service because the currently active BWP is the same as the BWP associated with the MBS service of interest (570).

Figure 6:
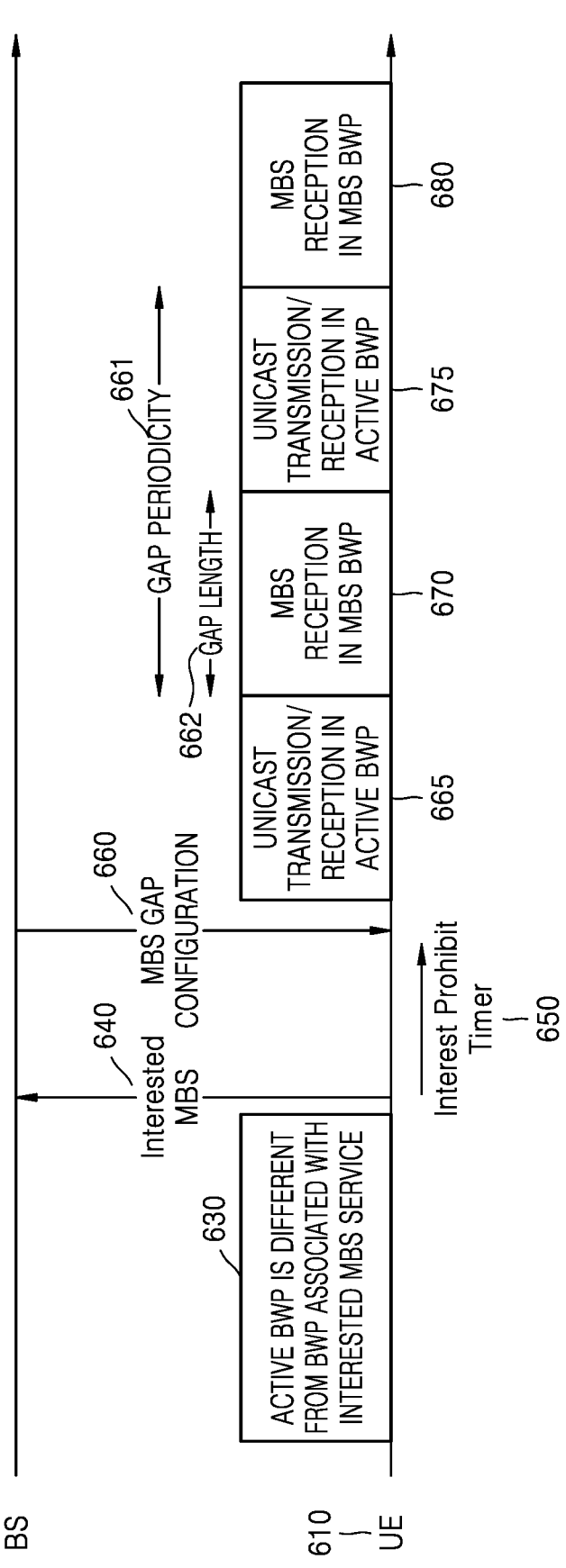
FIG. 6 illustrates a method, performed by a UE, of receiving an MBS service by configuring an MBS gap by a base station, according to an embodiment of the present disclosure.

FIG. 6 illustrates a method, performed by a UE, of receiving an MBS service by configuring an MBS gap by a BS, according to an embodiment of the present disclosure.

The embodiment of FIG. 6 relates to, when a BWP where an MBS service that a UE 610 is interested in is provided is different from an active BWP, a method by which the UE 610 informs a BS 620 of the MBS service of interest and the BS 620 provides the MBS service to the UE 610 in a BWP other than the active BWP by configuring a corresponding MBS gap.

In the embodiment of FIG. 6, the UE 610 may receive, from the BS 620, data on the active BWP. However, at this time, an MBS service that the UE 610 is interested in may not be provided on the active BWP (630).

If the active BWP is different from a BWP associated with the MBS service desired by the UE 610, the UE 610 may inform the BS 620 that there is an MBS service of interest in order to receive the MBS service of interest, and request or induce an MBS gap for receiving the MBS service (640). A message transmitted by the UE 610 to the BS 620 in operation 640 may include a list of MBS services that the UE 610 desires to receive. According to an embodiment, the unit of the MBS service may be a tmgi. Furthermore, according to an embodiment, a UE assistance information message may be used as the message transmitted in operation 640. After the UE 610 informs the BS 620 that there is the MBS service of interest (640), the BS 620 may configure an MBS gap in order for the UE to receive data associated with the MBS service on a BWP where the MBS service is provided (660). In operation 660, the BS 620 may transmit a list of MBS services provided on the BWP and configuration information for the MBS gap by using an RRC Reconfiguration message or a SIB message. Furthermore, the BS 620 may configure a G-RNTI via which the corresponding MBS services can be received. However, in order to actually apply the corresponding MBS gap after configuring it, the BS 620 may additionally transmit an activation message in the form of DCI or a MAC control element (MAC CE). However, because the BS 620 is not required to provide the UE 610 with the MBS service that the UE 610 is interested in, the BS 620 does not necessarily need to perform an operation of configuring the MBS gap or the like. For example, the BS 620 may keep the UE 610 staying on the currently active BWP according to the operation of a communication network, and may not transmit data associated with the MBS service that the UE 610 is interested in. However, because the UE 610 cannot know a situation of the BS 620 and a decision made by the BS 620, the UE 610 may repeat operation 640 of informing the BS 620 that there is an MBS service of interest and requesting or inducing the MBS service to be provided. However, the message repeatedly transmitted by the UE 610 may cause unnecessary resource consumption, and thus, repeated transmission of the message needs to be avoided. To this end, after the UE 610 transmits the message informing the BS 620 that there is an MBS service of interest (640), a prohibit timer for transmission of the corresponding message may be started (650). When the prohibit timer is running, the UE 610 may not transmit a message informing the BS 620 that there is an MBS service of interest. Only when the corresponding prohibit timer is stopped, the UE 610 may transmit a message informing the BS 620 that there is an MBS service of interest. In an embodiment, the message informing the BS 620 that there is an MBS service that the UE 610 is interested in may be transmitted when the list of MBS services that the UE 610 is interested in are changed and the prohibit timer is stopped.

Thereafter, in operation 660, an MBS gap is configured for the UE 610 so that the UE 610 may move to an MBS BWP during an MBS gap period to receive the MBS service of interest therein. The MBS gap for the UE 610 may have a gap length 662 repeated at a regular gap periodicity 661. In operation 660, at least one of the gap periodicity 661 of the MBS gap, the gap length 662 of the MBS gap, and an offset time point at which the periodicity starts may be configured in an MBS gap configuration message transmitted by the BS 620. The UE 610 does not transmit or receive data on an active BWP during the MBS gap period. In addition, the UE 610 may not perform PDCCH monitoring on the active BWP. Instead, the UE 610 may receive data associated with the MBS service by moving to a BWP on which the MBS service of interest is provided during the MBS gap period (670 and 680). According to an embodiment, the UE 610 may transmit or receive unicast data to or from the BS 620 on an active BWP during a duration other than the MBS gap period (665 and 675).

The MBS gap described with reference to FIG. 6 is configured per cell (or on an active BWP of a cell) so that the UE 610 moves to another BWP in the cell to receive an MBS service. Because the MBS gap is for transmitting and receiving MBS services, the MBS gap may not be applied when it overlaps with at least one of random access, a measurement gap, semi-persistent scheduling (SPS), a configured grant, a physical UL control channel (PUCCH), or a sounding reference signal (SRS) on a time axis. In addition, when the BS 620 indicates BWP switch to the UE 610, the configured MBS gap may no longer be applied.

Figure 7:
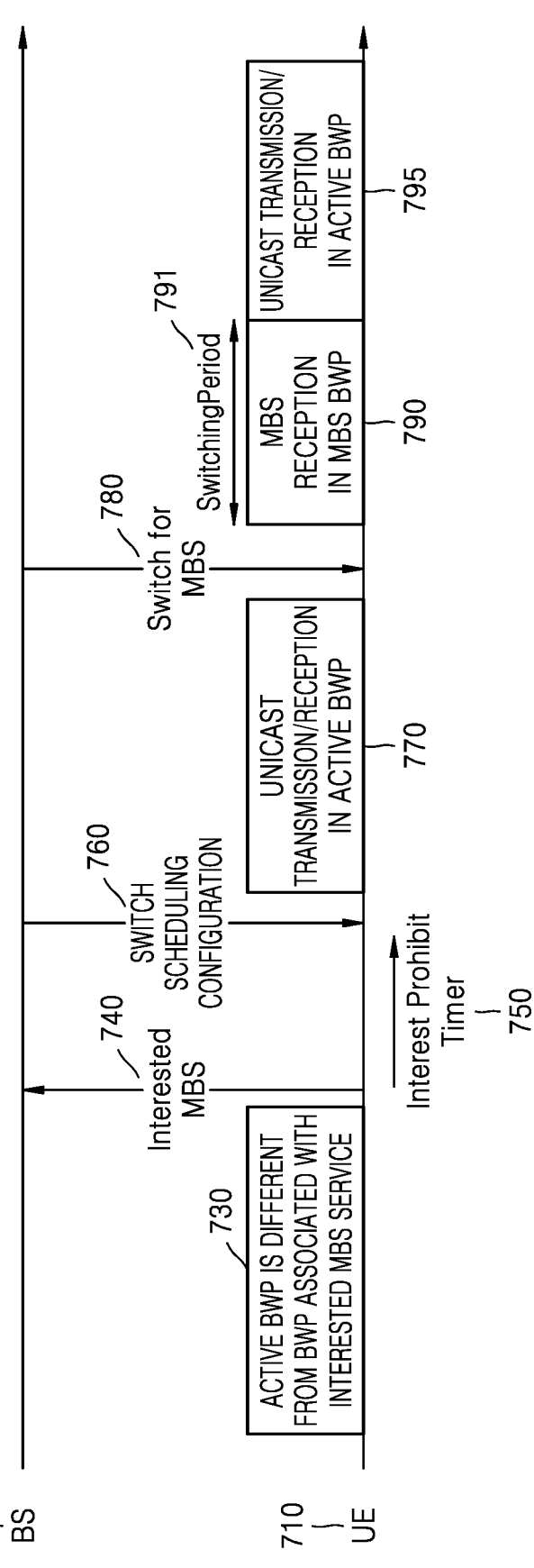
FIG. 7 illustrates a method, performed by a UE, of receiving an MBS service by configuring an MBS switching period by a base station, according to an embodiment of the present disclosure.

FIG. 7 illustrates a method, performed by a UE, of receiving an MBS service by configuring an MBS switching period by a BS, according to an embodiment of the present disclosure.

The embodiment of FIG. 7 relates to, when a BWP where an MBS service that a UE 710 is interested in is provided is different from an active BWP, a method by which the UE 710 informs a BS 720 of the MBS service of interest and the BS 720 provides the MBS service to the UE 710 on a BWP other than the active BWP by configuring a corresponding MBS switching period.

In the embodiment of FIG. 7, the UE 710 may receive, from the BS 720, data on the active BWP. However, at this time, an MBS service that the UE 710 is interested in may not be provided on the active BWP (730).

If the active BWP is different from a BWP associated with the MBS service desired by the UE 710, the UE 710 may inform the BS 720 that there is an MBS service of interest in order to receive the MBS service of interest, and request or induce configuration of an MBS switching period for receiving the MBS service (740). A message transmitted by the UE 710 to the BS 720 in operation 740 may include a list of MBS services that the UE 710 desires to receive. According to an embodiment, the unit of the MBS service may be a tmgi. Furthermore, according to an embodiment, a UE assistance information message may be used as the message transmitted in operation 740.

After the UE 710 informs the BS 720 that there is the MBS service of interest (740), the BS 720 may configure an MBS switching period in order for the UE 710 to receive data associated with the MBS service on a BWP where the MBS service is provided (760). In operation 760, the BS 720 may transmit a list of MBS services provided on the BWP and configuration information for the MBS switching period by using an RRC Reconfiguration message or a SIB message. Furthermore, the BS 720 may configure a G-RNTI via which the corresponding MBS services can be received.

However, after configuring the MBS switching period, the configured MBS switching period may be applied by a switch for MBS command from the BS 720 (780). After receiving the switch for MBS command from the BS 720, the UE 710 may move to a BWP on which the MBS service of interest is provided during a switching period 791 to receive data for the MBS service on the BWP. However, because the BS 720 is not required to provide the UE 710 with the MBS service that the UE 710 is interested in, the BS 720 does not necessarily need to perform an operation of configuring the MBS switching period or the like. For example, the BS 720 may keep the UE 710 staying on the currently active BWP according to the operation of a communication network, and may not transmit data associated with the MBS service that the UE 710 is interested in. However, because the UE 710 cannot know the situation of the BS 720 and a decision made by the BS 720, the UE 710 may repeat operation 740 of informing the BS 720 that there is an MBS service of interest and requesting or inducing the MBS service to be provided. However, the message repeatedly transmitted by the UE 710 may cause unnecessary resource consumption, and thus, repeated transmission of the message needs to be avoided. To this end, after the UE 710 transmits the message informing the BS 720 that there is an MBS service of interest (740), a prohibit timer for transmission of the corresponding message may be started (750). When the prohibit timer is running, the UE 710 may not transmit a message informing the BS 720 that there is an MBS service of interest. Only when the corresponding prohibit timer is stopped, the UE 710 may transmit a message informing the BS 720 that there is an MBS service of interest. According to an embodiment, the message informing the BS 720 that there is an MBS service that the UE 710 is interested in may be transmitted when the list of MBS services that the UE 710 is interested in are changed and the prohibit timer is stopped.

In a case that the MBS switching period is configured for the UE 710 in operation 760, after receiving the switch for MBS command from the BS 720 in operation 780, the UE 710 may move to an MBS BWP during the switching period to receive the MBS service of interest in the MBS BWP. At this time, the switch for MBS command from the BS 720 may be indicated to the UE 710 by DCI or a MAC CE. Configuration of the MBS switching period and a length of the switching period may be configured in an MBS switching period configuration message transmitted in operation 760. The UE 710 does not transmit or receive data in an active BWP during the switching period 791. In addition, the UE 710 may not perform PDCCH monitoring on the active BWP. Instead, the UE 710 may receive data associated with the MBS service by moving to a BWP on which the MBS service of interest is provided during the switching period 791 (790). According to an embodiment, the UE 710 may transmit or receive unicast data to or from the BS 720 in an active BWP during a duration other than the switching period 791 (795). According to an embodiment, when the UE 710 receives a preset positive number of PDSCHs or MAC protocol data units (PDUs) in the switching period 791, the UE 710 may move to an active BWP regardless of a length of the remaining switching period. In this embodiment, the preset positive number may be 1.

The MBS switching period described with reference to FIG. 7 is configured per cell (or in an active BWP of a cell) so that the UE 710 moves to another BWP in the cell to receive an MBS service. Because the MBS switching period is for transmitting and receiving MBS services, the MBS switching period may not be applied when it overlaps with resources for at least one of random access, a measurement gap, a PUCCH, or an SRS on a time axis. In addition, when the BS 720 indicates BWP switch to the UE 710, the configured MBS switching period may no longer be applied.

Figure 8:
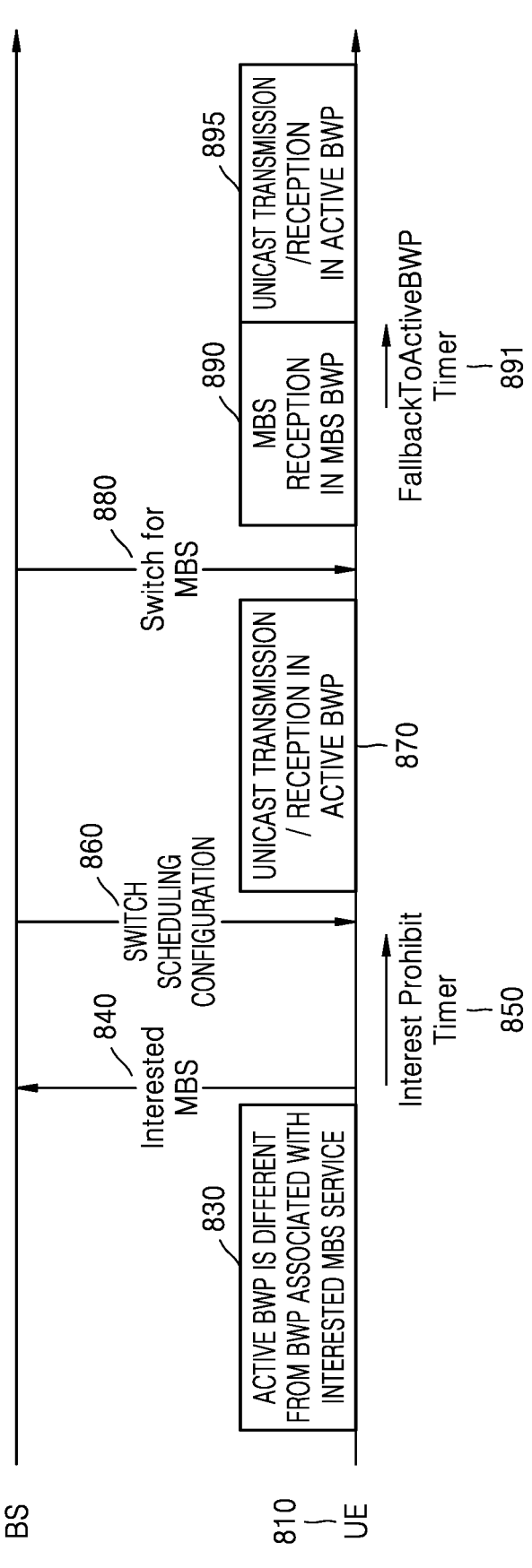
FIG. 8 illustrates a method, performed by a UE, of receiving an MBS service by configuring an MBS switching period by a base station, according to an embodiment of the present disclosure.

FIG. 8 illustrates a method, performed by a UE, of receiving an MBS service by configuring an MBS switching period by a BS, according to an embodiment of the present disclosure.

The embodiment of FIG. 8 relates to, when a BWP where an MBS service that a UE 810 is interested in is provided is different from an active BWP, a method by which the UE 810 informs a BS 820 of the MBS service of interest and the BS 820 provides the MBS service to the UE 810 in a BWP other than the active BWP by configuring a corresponding MBS switching period.

In the embodiment of FIG. 8, the UE 810 may receive, from the BS 820, data on the active BWP. However, at this time, an MBS service that the UE 810 is interested in may not be provided on the active BWP (830).

If the active BWP is different from a BWP associated with the MBS service desired by the UE 810, the UE 810 may inform the BS 820 that there is an MBS service of interest in order to receive the MBS service of interest, and request or induce configuration of an MBS switching period for receiving the MBS service (840). A message transmitted by the UE 810 to the BS 820 in operation 840 may include a list of MBS services that the UE 810 desires to receive. According to an embodiment, the unit of the MBS service may be a tmgi. Furthermore, according to an embodiment, a UE assistance information message may be used as the message transmitted in operation 840. After the UE 810 informs the BS 820 that there is the MBS service of interest (840), the BS 820 may configure an MBS switching period in order for the UE 810 to receive data associated with the MBS service on a BWP where the MBS service is provided (860). In operation 860, the BS 820 may transmit a list of MBS services provided on the BWP and configuration information for the MBS switching period by using an RRC Reconfiguration message or a SIB message. When configuring the MBS switching period, a duration of a FallBackToActiveBWP timer may be set. Furthermore, the BS 820 may configure a G-RNTI via which the corresponding MBS services can be received. However, after configuring the MBS switching period, the configured MBS switching period may be applied by a switch for MBS command from the BS 820 (880). After receiving the switch for MBS command from the BS 820, the UE 810 may move to a BWP on which the MBS service of interest is provided during a switching period to receive data for the MBS service on the BWP.

In the embodiment of FIG. 8, a length of the switching period may not be a predetermined value. According to an embodiment, the length of the switching period may be a duration of time until expiry of the FallBackToActiveBWP timer 891 which starts when the switch for MBS command is received or data for MBS is received. The UE 820 may stay in the BWP where the MBS service of interest is provided during the length of the switching period.

In the present embodiment, because the BS 820 is not required to provide the UE 810 with the MBS service that the UE 810 is interested in, the BS 820 does not necessarily need to perform an operation of configuring the MBS switching period or the like. For example, the BS 820 may keep the UE 810 staying on the currently active BWP according to the operation of a communication network, and may not transmit data associated with the MBS service that the UE 810 is interested in. However, because the UE 810 cannot know a situation of the BS 820 and a decision made by the BS 820, the UE 810 may repeat operation 840 of informing the BS 820 that there is an MBS service of interest and requesting or inducing the MBS service to be provided. However, the message repeatedly transmitted by the UE 810 may cause unnecessary resource consumption, and thus, repeated transmission of the message needs to be avoided. To this end, after the UE 810 transmits the message informing the BS 820 that there is an MBS service of interest (840), a prohibit timer for transmission of the corresponding message may be started (850). When the prohibit timer is running, the UE 810 may not transmit a message informing the BS 820 that there is an MBS service of interest. Only when the corresponding prohibit timer is stopped, the UE 810 may transmit a message informing the BS 820 that there is an MBS service of interest. In an embodiment, the message informing the BS 820 that there is an MBS service that the UE 810 is interested in may be transmitted when the list of MBS services that the UE 810 is interested in are changed and the prohibit timer is stopped.

In a case that the MBS switching period is configured for the UE 810 in operation 860, after receiving the switch for MBS command from the BS 820, the UE 810 may move to an MBS BWP until the FallBackToActiveBWP timer 891 expires to receive the MBS service of interest in the MBS BWP. At this time, the switch for MBS command from the BS 820 may be indicated to the UE 810 by DCI or a MAC CE. Configuration of the MBS switching period may be configured in an MBS switching period configuration message transmitted in operation 860. The UE 810 does not transmit or receive data in an active BWP while the FallBackToActiveBWP timer 891 is running. Also, the UE 810 may not perform PDCCH monitoring on the active BWP. Instead, the UE 810 may receive data associated with the MBS service by moving to a BWP on which the MBS service of interest is provided (890). According to an embodiment, the UE 810 may transmit or receive unicast data to or from the BS 820 in an active BWP during a duration other than the MBS switching period (895).

The MBS switching period described with reference to FIG. 8 is configured per cell (or in an active BWP of a cell) so that the UE 810 moves to another BWP in the cell to receive an MBS service. Because the MBS switching period is for transmitting and receiving MBS services, the MBS switching period may not be applied when it overlaps with resources for at least one of random access, a measurement gap, a PUCCH, or an SRS on the time axis. In addition, when the BS 820 indicates BWP switch to the UE 810, the configured MBS switching period may no longer be applied.

Figure 9:
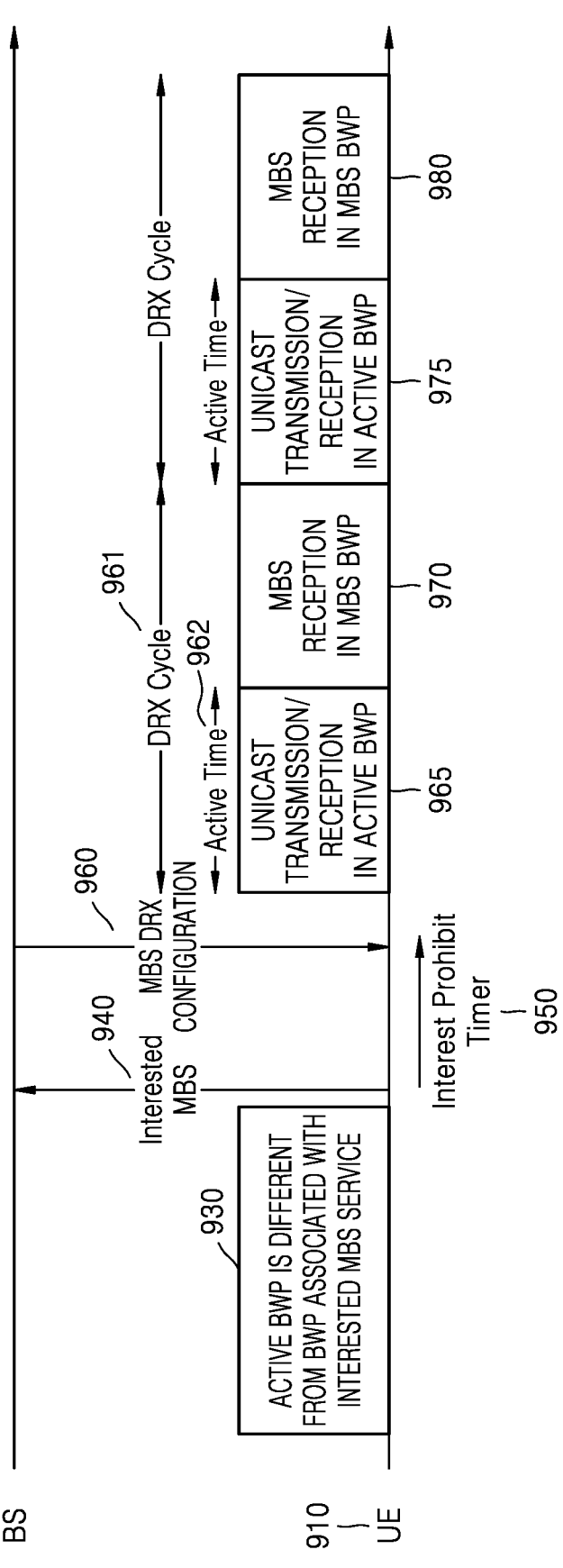
FIG. 9 illustrates a method, performed by a UE, of receiving an MBS service by configuring discontinuous reception (DRX) by a base station, according to an embodiment of the present disclosure.

FIG. 9 illustrates a method, performed by a UE, of receiving an MBS service by configuring discontinuous reception (DRX) by a base station, according to an embodiment of the present disclosure.

The embodiment of FIG. 9 relates to, when a BWP where an MBS service that a UE 910 is interested in is provided is different from an active BWP, a method by which the UE 910 informs a BS 920 of the MBS service of interest and the BS 920 provides the MBS service to the UE 910 in a BWP other than the active BWP by configuring corresponding DRX.

In the embodiment of FIG. 9, the UE 910 may receive, from the BS 920, data on the active BWP. However, at this time, an MBS service that the UE 910 is interested in may not be provided on the active BWP (930).

If the active BWP is different from a BWP associated with the MBS service desired by the UE 910, the UE 910 may inform the BS 920 that there is an MBS service of interest in order to receive the MBS service of interest, and request or induce configuration of DRX for receiving the MBS service (940). A message transmitted by the UE 910 to the BS 920 in operation 940 may include a list of MBS services that the UE 910 desires to receive. According to an embodiment, the unit of the MBS service may be a tmgi. Furthermore, according to an embodiment, a UE assistance information message may be used as the message transmitted in operation 940.

After the UE 910 informs the BS 920 that there is the MBS service of interest (940), the BS 920 may configure DRX in order for the UE 910 to receive data associated with the MBS service on a BWP where the MBS service is provided (960). In operation 960, by using an RRC Reconfiguration message or a SIB message, the BS 920 may transmit a list of MBS services provided on the BWP, configuration information for the DRX, and indicator information indicating that the UE 910 may move to a BWP on which the MBS service of interest is provided during a time other than an active time of a DRX cycle to receive the MBS service. Furthermore, the BS 920 may configure a G-RNTI via which the corresponding MBS services can be received. However, in order to actually apply the corresponding DRX after configuring it, the BS 920 may additionally transmit an activation message in the form of DCI or a MAC CE.

However, because the BS 920 is not required to provide the UE 910 with the MBS service that the UE 910 is interested in, the BS 920 does not necessarily need to perform an operation of configuring the DRX for receiving data for the MBS service or the like. For example, the BS 920 may keep the UE 910 staying on the currently active BWP according to the operation of a communication network, and may not transmit data associated with the MBS service that the UE 910 is interested in. However, because the UE 910 cannot know a situation of the BS 920 and a decision made by the BS 920, the UE 910 may repeat operation 940 of informing the BS 920 that there is an MBS service of interest and requesting or inducing the MBS service to be provided. However, the message repeatedly transmitted by the UE 910 may cause unnecessary resource consumption, and thus, repeated transmission of the message needs to be avoided. To this end, after the UE 910 transmits the message informing the BS 920 that there is an MBS service of interest (940), a prohibit timer for transmission of the corresponding message may be started (950). When the prohibit timer is running, the UE 910 may not transmit a message informing the BS 920 that there is an MBS service of interest. Only when the corresponding prohibit timer is stopped, the UE 910 may transmit a message informing the BS 920 that there is an MBS service of interest. In an embodiment, the message informing the BS 920 that there is an MBS service that the UE 910 is interested in may be transmitted when the list of MBS services that the UE 910 is interested in are changed and the prohibit timer is stopped.

In a case that the DRX for an MBS service is configured for the UE 910 in operation 960, the UE 910 may move to an MBS BWP during a time period other than an active time 962 to receive the MBS service of interest in the MBS BWP (970 and 980). The DRX for the UE 910 may be repeated for each DRX cycle 961 that is a regular cycle. A length of the DRX cycle of the UE 910 and an offset time point at which the DRX cycle starts may be configured in a DRX configuration message for MBS transmitted in operation 960. The UE 910 does not transmit or receive data in an active BWP during a time period other than the active time 962. In addition, the UE 910 may not perform PDCCH monitoring on the active BWP. Instead, the UE 910 may receive data associated with the MBS service by moving to a BWP on which the MBS service of interest is provided during the time period other than the active time 962 (970 and 980). On the other hand, the UE 910 may transmit or receive unicast data to or from the BS 920 in an active BWP during the active time 962 (965 and 975).

The DRX for MBS described with reference to FIG. 9 is configured per cell or per group of multiple cells so that the UE 910 moves to another BWP in the cell to receive an MBS service. Because the DRX configured in this way is for MBS services, the UE 910 may stay in the active time 962 in a case where the DRX overlaps with at least one of random access, a measurement gap, a PUCCH, or an SRS on the time axis even during a time period other than the active time 962. In addition, when the BS 920 indicates BWP switch to the UE 910, the configured DRX may no longer be applied.

Figure 10:
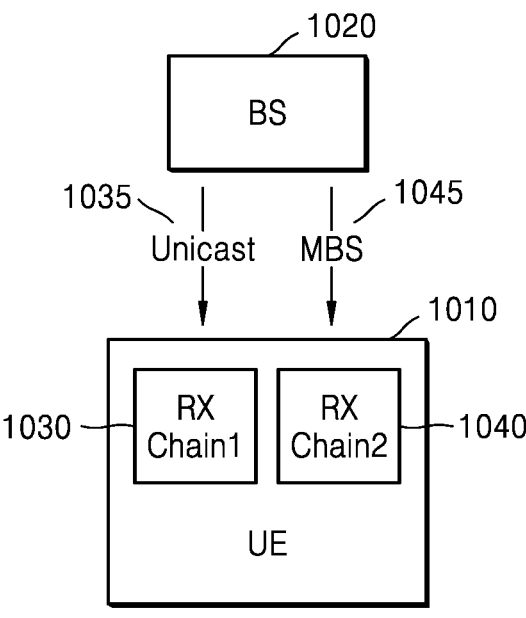
FIG. 10 illustrates a structure of a UE having two RX chains for an MBS service, according to an embodiment of the present disclosure.

FIG. 10 illustrates a structure of a UE having two RX chains for an MBS service, according to an embodiment of the present disclosure.

While a UE 1010 operates in a specific active BWP, an MBS service that the UE 1010 is interested in may not be provided on the active BWP. In this case, a BWP 1035 used by the UE 1010 to transmit or receive unicast data to or from a BS 1020 may be different from a BWP 1045 on which the UE 1010 receives an MBS service. Accordingly, the UE 1010 may include two RX chains, i.e., an RX chain 1030 for unicast and an RX chain 1040 for MBS. However, in this case, the UE 1010 may need to receive, from the BS 1020, information about when to use the RX chain 1040 for MBS and a reception configuration when using the RX chain 1040 for MBS. In an embodiment of FIG. 11, an operation in which the UE 1010 having two RX chains receives an MBS service and data for the MBS service is described below.

Figure 11:
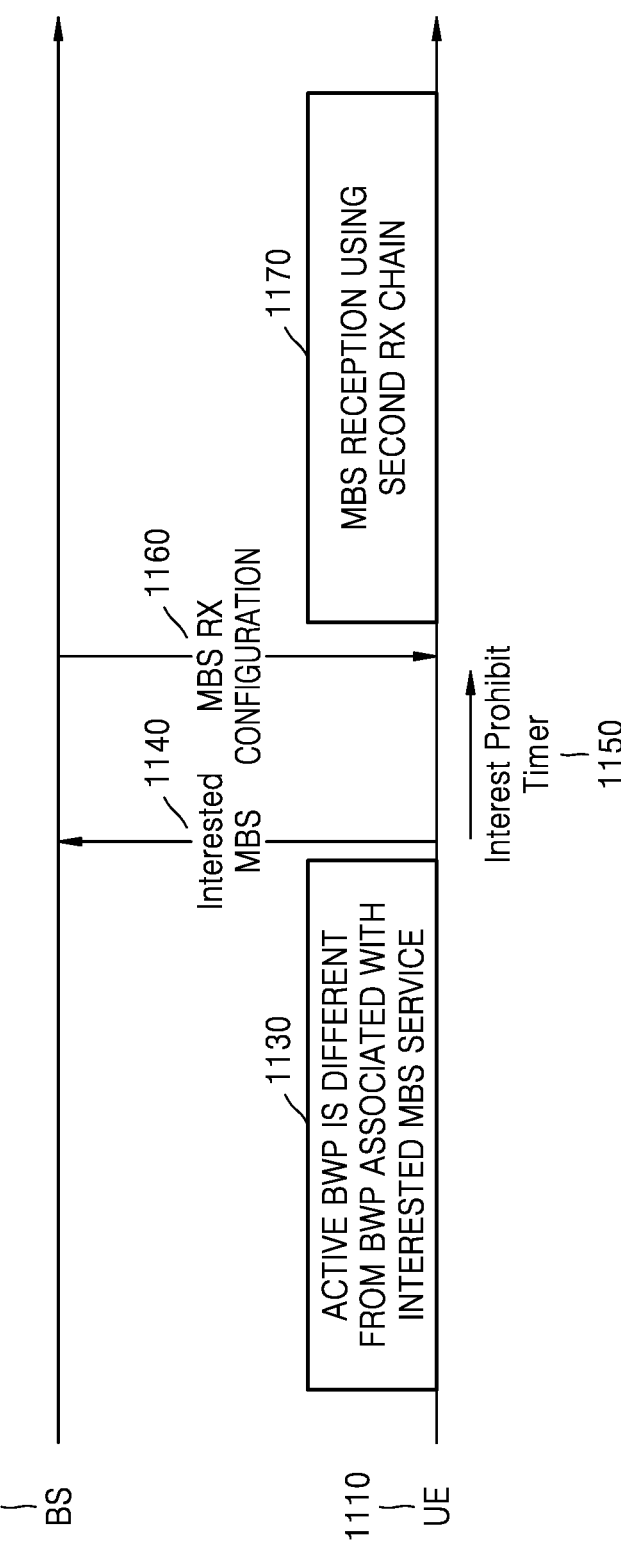
FIG. 11 illustrates a method, performed by a UE, of receiving an MBS service by using two RX chains, according to an embodiment of the present disclosure.

FIG. 11 illustrates a method, performed by a UE, of receiving an MBS service by using two RX chains, according to an embodiment of the present disclosure.

The embodiment of FIG. 11 relates to, when a BWP where an MBS service that a UE 1110 is interested in is provided is different from an active BWP, a method by which the UE 1110 informs a BS 1120 of the MBS service of interest and receives data for the MBS service by using RX chains for the MBS service.

In the embodiment of FIG. 11, the UE 1110 may receive, from the BS 1120, data on the active BWP. However, at this time, an MBS service that the UE 1110 is interested in may not be provided on the active BWP (1130). If the active BWP is different from a BWP associated with the MBS service desired by the UE 1110, the UE 1110 may inform the BS 1120 that there is an MBS service of interest in order to receive the MBS service of interest, and request or induce a configuration for receiving the MBS service by using an RX chain for MBS (1140). A message transmitted by the UE 1110 to the BS 1120 in operation 1140 may include a list of MBS services that the UE 1110 desires to receive. According to an embodiment, the unit of the MBS service may be a tmgi. Furthermore, according to an embodiment, a UE assistance information message may be used as the message transmitted in operation 1140. After the UE 1110 informs the BS 1120 that there is the MBS service of interest (1140), the BS 1120 may configure and indicate the UE 1110 to use an RX chain for MBS (1160). In operation 1160, an operation of configuring the UE 1110 to use RX chain for MBS may be indicated by the BS 1120 transmitting an RRC Reconfiguration message to the UE 1110 in the RRC Connected mode or transmitting a command in DCI on a PDCCH.

However, because the BS 1120 is not required to make the UE 1110 receive data for an MBS service by using the RX chain for MBS, the BS 1120 may allow the UE 1110 to transmit and receive data only on the currently active BWP according to the operation of a communication network. However, because the UE 1110 cannot know a situation of the BS 1120 and a decision made by the BS 1120, the UE 1110 may repeat operation 1140 of informing the BS 1120 that there is an MBS service of interest and requesting or inducing reception of data for the MBS service by using the RX chain for MBS. However, the message repeatedly transmitted by the UE 1110 as described above may cause unnecessary resource consumption, and thus, repeated transmission of the message needs to be avoided. To this end, after the UE 1110 transmits the message informing the BS 1120 that there is an MBS service of interest (1140), a prohibit timer for transmission of the corresponding message may be started (1150). When the prohibit timer is running, the UE 1110 may not transmit a message informing the BS 1120 that there is an MBS service of interest. Only when the corresponding prohibit timer is stopped, the UE 1110 may transmit a message informing the BS 1120 that there is an MBS service of interest. According to an embodiment, the message informing the BS 1120 that there is an MBS service that the UE 1110 is interested in may be transmitted when the list of MBS services that the UE 1110 is interested in are changed and the prohibit timer is stopped.

If the UE 1110 is configured to receive data for an MBS service by using an RX chain for MBS in operation 1160, the UE 1110 may receive data on the currently active BWP by using an RX chain for unicast and receive the data for the MBS service on a BWP where the MBS service is provided by using the RX chain for MBS (1170).

Figure 12:
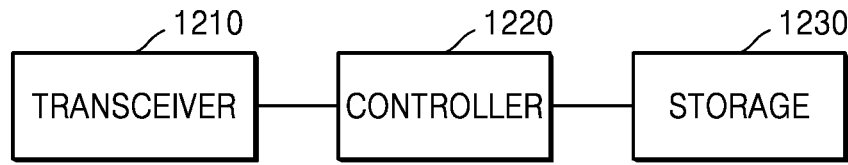
FIG. 12 is a diagram illustrating a structure of a base station according to an embodiment of the present disclosure.

FIG. 12 is a diagram illustrating a structure of a BS according to an embodiment of the present disclosure.

Referring to FIG. 12, the BS may include a transceiver 1210, a controller 1220, and a storage 1230. However, all the illustrated components are not essential. For example, the BS may include more or fewer components than those shown in FIG. 12. In addition, the transceiver 1210, the controller 1220, and the storage 1230 may be implemented as a single chip according to another embodiment. In the present disclosure, the controller 1220 may be defined as a circuit or an application-specific integrated circuit, or at least one processor.

The transceiver 1210 may transmit or receive signals to or from other network entities. For example, the transceiver 1210 may transmit, to a UE, system information as well as a synchronization signal or a reference signal. The transceiver 1210 may include an RF transmitter for up-converting and amplifying a frequency of a signal to be transmitted and an RF receiver for low-noise amplifying a received signal and down-converting its frequency. However, according to another embodiment, the transceiver 1210 may be implemented by more or fewer components than those described above.

The transceiver 1210 may be connected to the controller 1220 to transmit and/or receive signals. The signals may include control information and data. Furthermore, the transceiver 1210 may receive a signal via a radio channel and output the signal to the controller 1220. The transceiver 1210 may transmit a signal output from the controller 1220 via a radio channel.

The controller 1220 may control all operations of the BS according to an embodiment proposed in the present disclosure. For example, the controller 1220 may control a flow of signals between blocks so that the BS performs operations according to the above-described flowcharts.

The storage 1230 may store at least one of information transmitted and received via the transceiver 1210 and information generated via the controller 1220.

Also, the storage 1230 may store control information or data included in a signal obtained by the BS. The storage 1230 may be connected to the controller 1220 to store at least one instruction, protocol, or parameter for a proposed function, process and/or method. The storage 1230 may be composed of storage media, such as read-only memory (ROM), random access memory (RAM), hard discs, compact disc (CD)-ROM, and digital versatile discs (DVDs), or a combination thereof.

Figure 13:
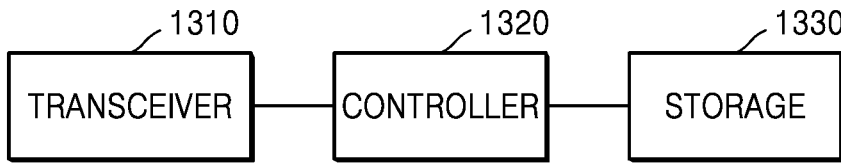
FIG. 13 is a diagram illustrating a structure of a UE according to an embodiment of the present disclosure.

FIG. 13 is a diagram illustrating a structure of a UE according to an embodiment of the present disclosure.

Referring to FIG. 13, the UE may include a transceiver 1310, a controller 1320, and a storage 1330. However, all the illustrated components are not essential. For example, the UE may include more or fewer components than those shown in FIG. 13. In addition, the transceiver 1310, the controller 1320, and the storage 1330 may be implemented as a single chip according to another embodiment. In the present disclosure, the controller 1320 may be defined as a circuit or an application-specific integrated circuit, or at least one processor.

The transceiver 1310 may transmit or receive signals to or from other network entities. For example, the transceiver 1310 may receive, from a BS, system information as well as a synchronization signal or a reference signal. Furthermore, the transceiver 1310 may include an RF transmitter for up-converting and amplifying a frequency of a signal to be transmitted and an RF receiver for low-noise amplifying a received signal and down-converting its frequency. However, according to another embodiment, the transceiver 1310 may be implemented by more or fewer components than those described above.

The transceiver 1310 may be connected to the controller 1320 to transmit and/or receive signals. The signals may include control information and data. Furthermore, the transceiver 1310 may receive a signal via a radio channel and output the signal to the controller 1320. The transceiver 1310 may transmit a signal output from the controller 1320 via a radio channel.

The controller 1320 may control all operations of the UE according to an embodiment proposed in the present disclosure. For example, the controller 1320 may control a flow of signals between blocks so that the UE performs operations according to the above-described flowcharts.

The storage 1330 may store at least one of information transmitted and received via the transceiver 1310 and information generated via the controller 1320.

Also, the storage 1330 may store control information or data included in a signal obtained by the UE. The storage 1330 may be connected to the controller 1320 to store at least one instruction, protocol, or parameter for a proposed function, process and/or method. The storage 1330 may be composed of storage media, such as ROM, RAM, hard discs, CD-ROM, and DVDs, or a combination of the storage media.

It should be noted that the above-described configuration diagrams, exemplary diagrams for a control/data signal transmission method, exemplary diagrams for operating procedures, and configuration diagrams are not intended to limit the scope of the present disclosure. In other words, all components, entities, or operations described in embodiments of the present disclosure should not be construed as being essential components for implementation of the present disclosure, and the present disclosure may be implemented by including only some of the components without departing the essence of the present disclosure. Furthermore, the embodiments may be combined with each other for operation when necessary. For example, parts of the methods presented in the present disclosure may be combined with one another to operate a network entity and a UE.

The above-described operations of the BS or UE may be implemented by providing a memory device storing corresponding program code in any component in the BS or UE. That is, a controller of the BS or UE may perform the above-described operations by causing a processor or a CPU to read and execute the program code stored in the memory device.

Various components, modules, etc. of an entity, the BS, or the UE described in the present specification may operate by using a hardware circuit, e.g., a complementary metal-oxide-semiconductor (CMOS)-based logic circuit, firmware, software, and/or a combination of hardware, firmware and/or software embedded in a machine-readable medium. For example, various electrical structures and methods may be implemented using electrical circuits such as transistors, logic gates, and an ASIC.

When the components and modules are implemented in software, a computer-readable storage medium having at least one program (software module) stored therein may be provided. The at least one program stored in the computer-readable storage medium is configured for execution by at least one processor within an electronic device. The at least one program includes instructions that cause the electronic device to execute the methods according to the embodiments of the present disclosure described in the claims or specification thereof.

The program (software module or software) may be stored in RAM, non-volatile memory including a flash memory, ROM, electrically erasable programmable ROM (EEPROM), magnetic disc storage devices, CD-ROM, DVDs or other types of optical storage devices, and magnetic cassettes. Alternatively, the program may be stored in a memory configured as a combination of some or all of the stated devices. A plurality of such devices may be included in the memory.

Furthermore, the program may be stored in an attachable storage device that may be accessed through communication networks, such as the Internet, Intranet, a local area network (LAN), a wide LAN (WLAN), and a storage area network (SAN), or a communication network configured in a combination thereof. The storage device may connect to a device for performing the methods according to the embodiments of the present disclosure via an external port. Furthermore, a separate storage device on a communication network may also connect to a device for performing the methods according to the embodiments of the present disclosure.

In the specific embodiments of the present disclosure, a component included in the present disclosure is expressed in a singular or plural form depending on the presented specific embodiments. However, singular or plural expressions are selected to be suitable for situations presented for convenience of descriptions, and the present disclosure is not limited to elements in a singular or plural form, i.e., an element expressed in a plural form may be configured as a single element, or an element expressed in a singular form may be configured as a plurality of elements.

Moreover, although specific embodiments have been described in the detailed description of the present disclosure, various modifications may be made therein without departing from the scope of the present disclosure. Thus, the scope of the present disclosure should not be limited to the described embodiments but be defined by the following claims as well as their equivalents. In other words, it is obvious to those of ordinary skill in the art that other modifications may be made based on the technical spirit of the present disclosure. Furthermore, the embodiments may be combined with each other for operation when necessary. For example, parts of the methods proposed in the present disclosure may be combined with one another to operate the BS and the UE. Although the embodiments are proposed based on a 5G or NR system, other modifications based on the technical spirit of the embodiments may also be applicable to other systems such as LTE, LTE-A, and LTE-A-Pro systems.

Moreover, although specific embodiments have been described in the detailed description of the present disclosure, various modifications may be made therein without departing from the scope of the present disclosure. Thus, the scope of the present disclosure should not be limited to the described embodiments but be defined by the following claims as well as their equivalents.

The invention claimed is:

1. A method performed by a user equipment (UE) in a wireless communication system, the method comprising:
 identifying that an active bandwidth part (BWP) is different from a BWP for a multicast and broadcast service (MBS) of interest;
 transmitting, to a base station, a message to request the MBS of interest for which the BWP is different from the active BWP to be provided on the active BWP, based on the identification, wherein the message includes a list of one or more MBSs of interest;
 starting a timer for prohibiting retransmission of the message to request the MBS of interest to be provided on the active BWP;
 receiving, from the base station, based on the message to request the MBS of interest to be provided on the active BWP, an updated list of one or more MBSs provided on the active BWP, wherein the updated list of the one or more MBSs includes the MBS of interest; and
 receiving the MBS of interest on the active BWP, based on the updated list of the one or more MBSs including the MBS of interest.

2. The method of claim 1, wherein the updated list of the one or more MBSs is included in a radio resource control (RRC) Reconfiguration message or a system information block message.

3. A method performed by a base station in a wireless communication system, the method comprising:
 in case that an active bandwidth part (BWP) is different from a BWP for a multicast and broadcast service (MBS) of interest, receiving, from a user equipment (UE), a message to request the MBS of interest for which the BWP is different from the active BWP to be provided on the active BWP, wherein the message includes a list of one or more MBSs f interest, and a timer for prohibiting retransmission of the message to request the MBS of interest to be provided on the active BWP is started at the UE;
 updating a list of one or more MBSs provided on the active BWP to include the MBS of interest, based on the message to request the MBS of interest to be provided on the active BWP;
 transmitting, to the UE, the updated list of the one or more MBSs including the MBS of interest; and
 transmitting, to the UE, the MBS of interest on the active BWP based on the updated list of the one or more MBSs including the MBS of interest.

4. The method of claim 3, wherein the updated list of the one or more MBSs is included in a radio resource control (RRC) Reconfiguration message or a system information block message.

5. A user equipment (UE) in a wireless communication system, the UE comprising:
 a communicator; and
 at least one processor connected with the communicator and configured to:
  identify that an active bandwidth part (BWP) is different from a BWP for a multicast and broadcast service (MBS) of interest,
  transmit, to a base station, a message to request the MBS of interest for which the BWP is different from the active BWP to be provided on the active BWP, based on the identification, wherein the message includes a list of one or more MBSs of interest,
  start a timer for prohibiting retransmission of the message to request the MBS of interest to be provided on the active BWP,
  receive, from the base station, based on the message to request the MBS of interest, to be provided on the active BWP, an updated list of one or more MBSs provided on the active BWP, wherein the updated list of the one or more MBSs includes the MBS of interest, and
  receive the MBS of interest on the active BWP, based on the updated list of the one or more MBSs including the MBS of interest.

6. A base station in a wireless communication system, the base station comprising:
 a communicator; and
 at least one processor connected with the communicator and configured to:
  in case that an active bandwidth part (BWP) is different from a BWP for a multicast and broadcast service (MBS) of interest, receive, from a user equipment (UE), a message to request the MBS of interest for which the BWP is different from the active BWP to be provided on the active BWP, wherein the message includes a list of one or more MBSs of interest, and a timer for prohibiting retransmission of the message to request the MBS of interest to be provided on the active BWP is started at the UE,
  update a list of one or more MBSs provided on the active BWP to include the MBS of interest, based on the message to request the MBS of interest to be provided on the active BWP,
  transmit, to the UE, the updated list of the one or more MBSs including the MBS of interest, and
  transmit, to the UE, the MBS of interest on the active BWP based on the updated list of the one or more MBSs including the MBS of interest.

* * * * *